US011677711B2

(12) United States Patent
Gross

(10) Patent No.: US 11,677,711 B2
(45) Date of Patent: Jun. 13, 2023

(54) METRICS-BASED TIMELINE OF PREVIEWS

(71) Applicant: SONY INTERACTIVE ENTERTAINMENT LLC, San Mateo, CA (US)

(72) Inventor: Michael Gross, Los Angeles, CA (US)

(73) Assignee: SONY INTERACTIVE ENTERTAINMENT LLC, San Mateo, CA (US)

(*) Notice: Subject to any disclaimer, the term of this patent is extended or adjusted under 35 U.S.C. 154(b) by 0 days.

(21) Appl. No.: 17/583,703

(22) Filed: Jan. 25, 2022

(65) Prior Publication Data

US 2022/0150587 A1 May 12, 2022

Related U.S. Application Data

(63) Continuation of application No. 16/573,546, filed on Sep. 17, 2019, now Pat. No. 11,233,764, which is a
(Continued)

(51) Int. Cl.
H04N 7/16 (2011.01)
H04L 51/52 (2022.01)
(Continued)

(52) U.S. Cl.
CPC .............. *H04L 51/52* (2022.05); *G06V 20/44* (2022.01); *G06V 20/46* (2022.01); *H04L 51/10* (2013.01); *H04N 21/2187* (2013.01); *H04N 21/4307* (2013.01); *H04N 21/4316* (2013.01); *H04N 21/43072* (2020.08); *H04N 21/44008* (2013.01);
(Continued)

(58) Field of Classification Search
CPC ........... H04N 21/2187; H04N 21/4307; H04N 21/4316; H04N 21/44008; H04N 21/44213; H04N 21/4532; H04N 21/45457; H04N 21/4668; H04N 21/4756; H04N 21/4788; H04N 21/812; H04L 51/10; H04L 51/52; G06V 20/46
See application file for complete search history.

(56) References Cited

U.S. PATENT DOCUMENTS 7,483,871 B2 1/2009 Herz
8,942,542 B1 1/2015 Sherrets et al.
(Continued)

FOREIGN PATENT DOCUMENTS

WO WO 2018/118267 6/2018
WO WO 2018/125392 7/2018
WO WO 2018/128713 7/2018

OTHER PUBLICATIONS

PCT Application No. PCT/US2017/061149 International Preliminary Report On Patentability dated Jul. 2, 2019.
(Continued)

*Primary Examiner* — Mulugeta Mengesha
(74) *Attorney, Agent, or Firm* — Polsinelli LLP

(57) ABSTRACT

Systems and methods are herein disclosed for displaying a smart preview of video content. A first claimed embodiment includes receiving video content. A system can then detect an event taking place during the video content having an event time. The system can then receive a request to display a preview of the video content. The system can then display the preview of the video content beginning at the event time.

19 Claims, 5 Drawing Sheets

Related U.S. Application Data continuation of application No. 15/400,944, filed on Jan. 6, 2017, now Pat. No. 10,419,384.

(51) Int. Cl.

| | | |
|---|---|---|
| *H04N 21/2187* | (2011.01) | |
| *H04L 51/10* | (2022.01) | |
| *H04N 21/431* | (2011.01) | |
| *H04N 21/44* | (2011.01) | |
| *H04N 21/442* | (2011.01) | |
| *H04N 21/45* | (2011.01) | |
| *H04N 21/466* | (2011.01) | |
| *H04N 21/475* | (2011.01) | |
| *H04N 21/4788* | (2011.01) | |
| *H04N 21/81* | (2011.01) | |
| *H04N 21/43* | (2011.01) | |
| *G06V 20/40* | (2022.01) | |
| *H04N 21/4545* | (2011.01) | |

(52) U.S. Cl.
CPC ... *H04N 21/44213* (2013.01); *H04N 21/4532* (2013.01); *H04N 21/45457* (2013.01); *H04N 21/4668* (2013.01); *H04N 21/4756* (2013.01); *H04N 21/4788* (2013.01); *H04N 21/812* (2013.01)

(56) References Cited

U.S. PATENT DOCUMENTS

| | | | |
|---|---|---|---|
| 9,094,738 B2 | 7/2015 | Kishore | |
| 9,098,572 B1 | 8/2015 | Reilly et al. | |
| 9,418,388 B1 | 8/2016 | Young | |
| 9,569,624 B1 | 2/2017 | Nijim et al. | |
| 9,715,901 B1* | 7/2017 | Singh | H04N 21/8547 |
| 10,366,132 B2 | 7/2019 | Jiron | |
| 10,419,384 B2 | 9/2019 | Gross | |
| 10,631,028 B2 | 4/2020 | Neufeld | |
| 11,115,692 B2 | 9/2021 | Neufeld | |
| 11,233,764 B2 | 1/2022 | Gross | |
| 2002/0040374 A1 | 4/2002 | Kent | |
| 2003/0177503 A1* | 9/2003 | Sull | G11B 27/28 |
| | | | 725/135 |
| 2004/0059705 A1 | 3/2004 | Wittke et al. | |
| 2005/0033657 A1 | 2/2005 | Herrington et al. | |
| 2005/0071328 A1 | 3/2005 | Lawrence | |
| 2007/0130602 A1 | 6/2007 | Gulli et al. | |
| 2007/0143493 A1 | 6/2007 | Mullig et al. | |
| 2007/0157234 A1 | 7/2007 | Walker | |
| 2009/0150784 A1 | 6/2009 | Denney et al. | |
| 2009/0228774 A1 | 9/2009 | Matheny et al. | |
| 2009/0249244 A1 | 10/2009 | Robinson et al. | |
| 2010/0123830 A1 | 5/2010 | Vunic | |
| 2010/0153848 A1 | 6/2010 | Saha | |
| 2011/0022549 A1 | 1/2011 | Zhuang et al. | |
| 2011/0107382 A1 | 5/2011 | Morris et al. | |
| 2012/0189273 A1* | 7/2012 | Folgner | H04N 9/8227 |
| | | | 386/E9.011 |
| 2012/0191692 A1 | 7/2012 | Wang | |
| 2013/0080895 A1 | 3/2013 | Rossman et al. | |
| 2013/0086159 A1 | 4/2013 | Gharachorloo et al. | |
| 2013/0097159 A1 | 4/2013 | Park et al. | |
| 2013/0117781 A1 | 5/2013 | Kim et al. | |
| 2013/0262476 A1 | 10/2013 | Barak et al. | |
| 2016/0070962 A1 | 3/2016 | Shetty et al. | |
| 2016/0105734 A1 | 4/2016 | Packard et al. | |
| 2016/0140227 A1 | 5/2016 | Lymberopoulos et al. | |
| 2016/0381111 A1 | 12/2016 | Barnett et al. | |
| 2018/0018972 A1 | 1/2018 | Ensor et al. | |
| 2018/0077440 A1 | 3/2018 | Wadhera et al. | |
| 2018/0120243 A1* | 5/2018 | Yashima | G06T 7/0008 |
| 2018/0132011 A1 | 5/2018 | Shichman et al. | |
| 2019/0361948 A1 | 11/2019 | Jiron | |

OTHER PUBLICATIONS

PCT Application No. PCT/US2017/061149 International Search Report and Written Opinion dated Feb. 1, 2018.
PCT Application No. PCT/US2017/061185 International Preliminary Report on Patentability dated Jul. 9, 2019.
PCT Application No. PCT/US2017/061185 International Search Report and Written Opinion dated Feb. 1, 2018.
PCT Application No. PCT/US2017/061189 International Preliminary Report on Patentability dated Jun. 25, 2019.
PCT Application No. PCT/US2017/061189 International Search Report and Written Opinion dated Jan. 30, 2018.
U.S. Appl. No. 15/400,944 Office Action dated Dec. 31, 2018.
U.S. Appl. No. 15/400,944 Final Office Action dated Aug. 3, 2018.
U.S. Appl. No. 15/400,944 Office Action dated Jan. 26, 2018.
U.S. Appl. No. 16/573,546 Final Office Action dated Apr. 6, 2021.
U.S. Appl. No. 16/573,546 Office Action dated Nov. 6, 2020.
U.S. Appl. No. 15/383,234 Office Action dated Apr. 25, 2019.
U.S. Appl. No. 15/383,234 Final Office Action dated Nov. 9, 2018.
U.S. Appl. No. 15/383,234 Office Action dated Mar. 20, 2018.
U.S. Appl. No. 16/854,469 Office Action dated Jan. 25, 2021.
U.S. Appl. No. 15/392,237 Office Action dated Sep. 10, 2018.
U.S. Appl. No. 16/525,092 Office Action dated Jul. 22, 2021.

* cited by examiner

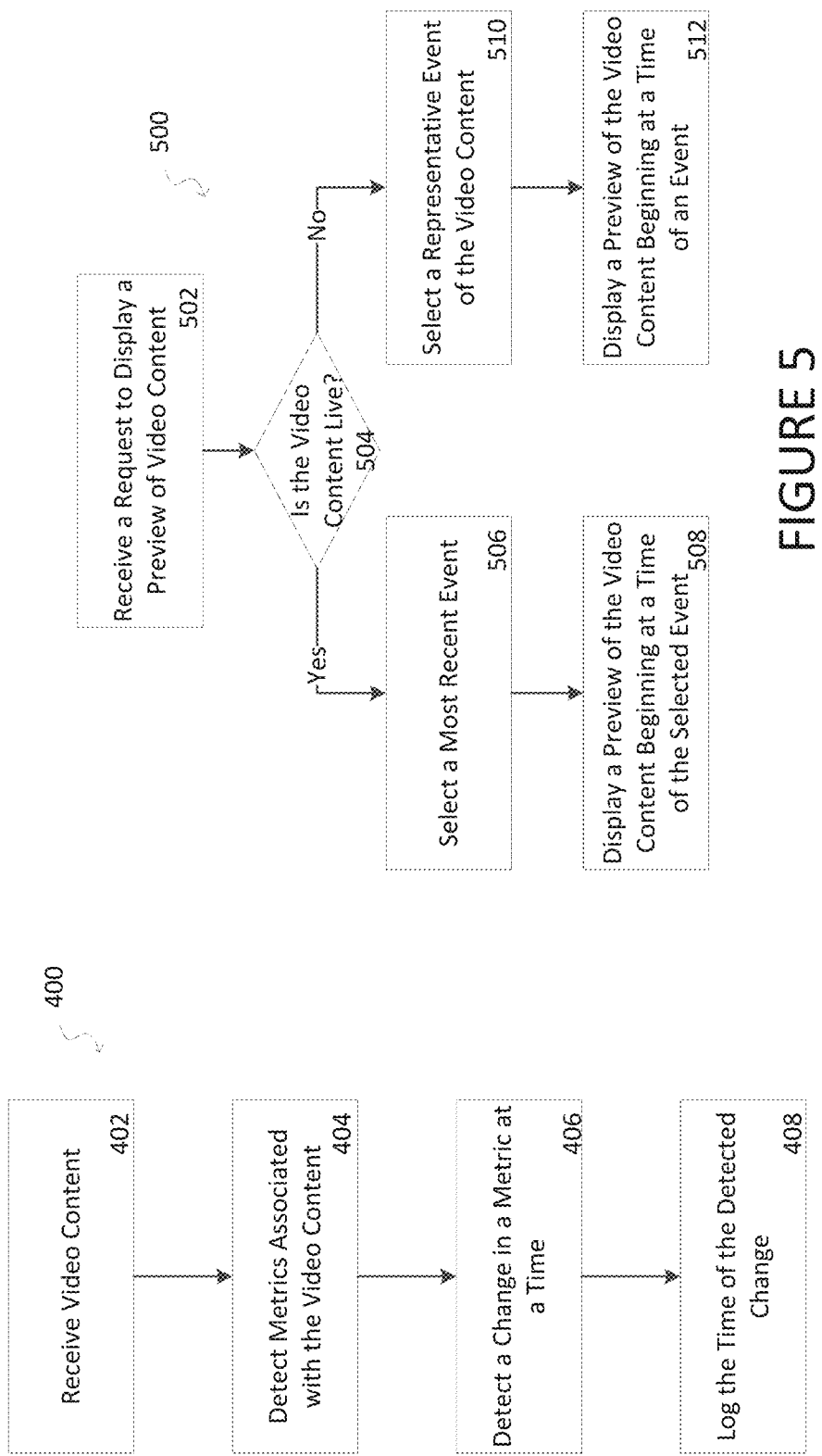

METRICS-BASED TIMELINE OF PREVIEWS

CROSS-REFERENCE TO RELATED APPLICATIONS

The present patent application is a continuation and claims the priority benefit of U.S. patent application Ser. No. 16/573,546 filed Sep. 17, 2019, now U.S. Pat. No. 11,233,764, which is a continuation and claims the priority benefit of U.S. patent application Ser. No. 15/400,944 filed Jan. 6, 2017, now U.S. Pat. No. 10,419,384, the disclosures of which are incorporated by reference herein.

BACKGROUND OF THE INVENTION

1. Field of the Invention

The present invention generally concerns providing previews of video content. More particularly, the present invention is related to detecting events within the video content and displaying previews of the events.

2. Description of the Related Art

When a viewer is watching a program such as a television show, a typically viewer may be curious about other programs that might be also available. For example, the viewer may be interested in another television show or a sports match. Systems exist for the viewer to bring up another video window that can show what is currently playing on another program. For example, picture-in-picture can provide some of this functionality. Other solutions include having a brief description of other available video content or a still image of the video content.

Most presently available video content recorders are unable, however, to analyze the incoming content in real-time with respect to events depicted within such content.

There is, therefore, a need in the art for improved systems and methods of network-based previews.

SUMMARY OF THE CLAIMED INVENTION

Systems and methods are herein disclosed for displaying a smart preview of video content. A first claimed embodiment includes receiving video content. A system can then detect an event taking place during the video content having an event time. The system can then receive a request to display a preview of the video content. The system can then display the preview of the video content beginning at the event time.

BRIEF DESCRIPTION OF THE DRAWINGS

FIG. 4 shows an exemplary method for detecting events in video content.

FIG. 5 shows an exemplary method for displaying a preview of video content.

DETAILED DESCRIPTION

Systems and methods are herein disclosed for displaying a smart preview of video content. A first claimed embodiment includes receiving video content. A system can then detect an event taking place during the video content having an event time. The system can then receive a request to display a preview of the video content. The system can then display the preview of the video content beginning at the event time.

Figure 1:
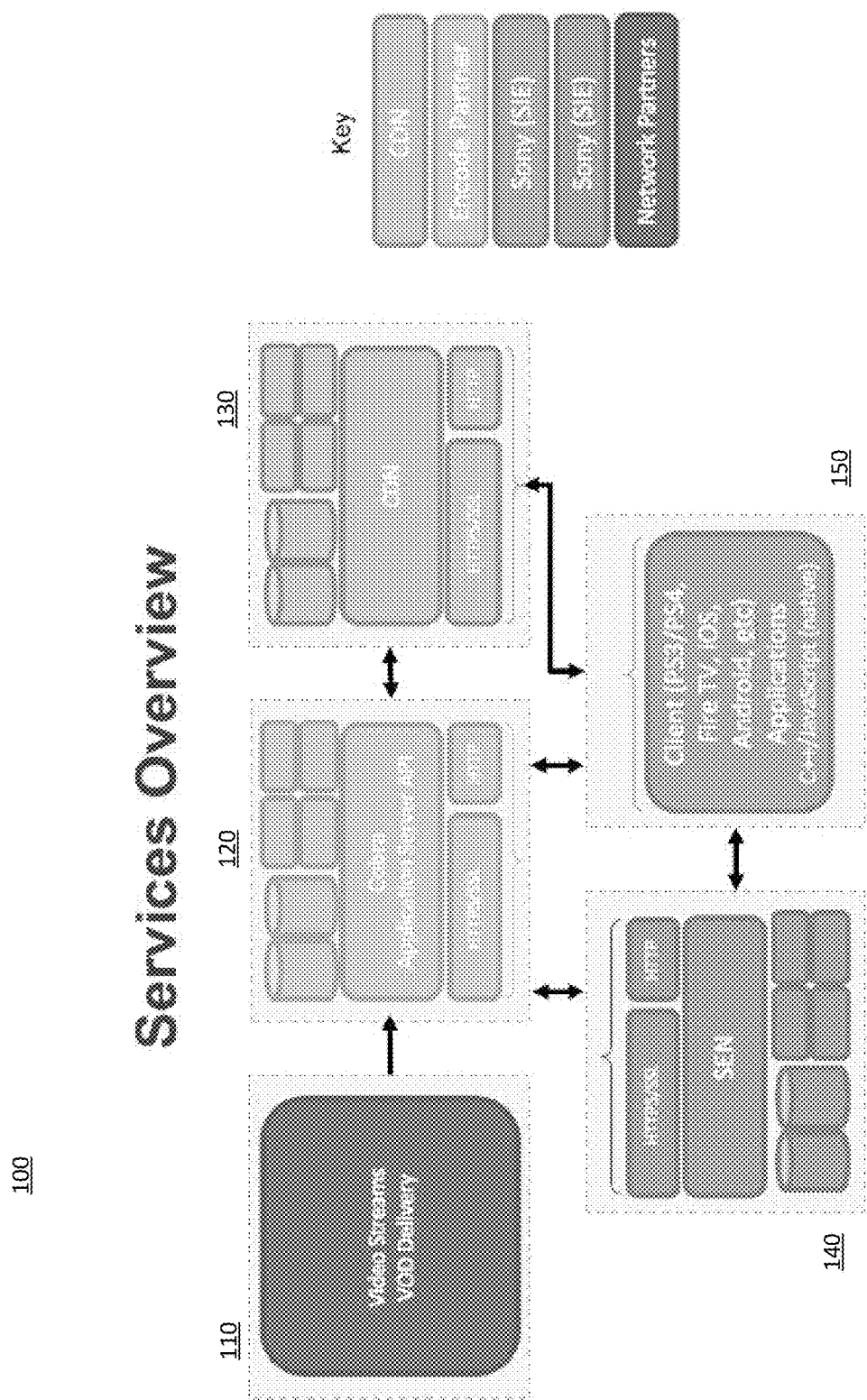
FIG. 1 shows an exemplary system configuration that may be used in implementing network-based previews and filtering.

FIG. 1 is an exemplary first party portal service 100 that provides customized content to a user. As illustrated in the figure, the first party portal service 100 includes a plurality of different elements that collectively work together in order to provide customized content for each user on their respective client device 150.

The first party portal service 100 can obtain video content from a variety of different video content sources 110. For example, the first party portal service 100 can access existing streaming media and/or video on demand (e.g., movies, television shows, online shows) in a similar manner as other existing video service providers (e.g., Netflix and Hulu). In some embodiments, the first party portal service 100 can also access third party video content from various third party content providers (e.g., Twitch, YouTube, Vine).

A Content Provider Server API (Application Program Interface) 120 provides instructions usable by the client device 150 associated with the first party platform service 100 regarding how to access content (e.g., streaming media, video on demand, third party content) from the different video content sources 110.

A Content Provider Server API 120 may be provided by each of the one or more content providers 110. The Content Provider Server API 120 facilitates access, by each of the client devices 150, to the content hosted by the content providers 120. This may mean that with each unique source of content 120, there may be a unique Content Provider Server API 120 that may facilitate the client device 150 in accessing the content hosted by that content source 110. There may be embodiments where Content Provider Server APIs 120 are shared between two or more sources of content 110 in situations where requirements for access of the content by the client device 150 is similar.

As described below, the Content Provider Server API 120 can access additional information about the content. Such additional information may include metadata (e.g., author, title, genre) describing the available content. The additional information may also include a location where the content is stored (e.g., URL) so that the user device can proceed with retrieving the content from the content source 110. The Content Provider Server API 120 can also include instructions for implementing functionalities such as chat that may allow different users simultaneously viewing the same content to interact with each other in real time.

The Content Provider Server API 120 can be accessed by a Content Delivery Network 130. The Content Delivery Network 130 may be a server that provides static resources used by the first party portal service 100. For example, static resources may include various files that are usable by the first party portal service 100 in order to provide information to the client device 150 when the client device 150 is not yet subscribed to the first party portal service 100. Such information may include promotional images and service configurations that facilitate functionality with client devices 150 that are not yet subscribed to the first party portal service 100.

It should be noted that subscriptions may or may not be needed with respect to different first party portal services. In some embodiments, subscriptions may require a periodic payment from the user in order to access services associated with the first party portal 100. In other embodiments, subscriptions may not require payment, but may instead require an authenticated user account associated with the first party portal 100. In a further embodiment, user devices may be provided different sets of features/benefits based on the type of subscription. For example, having an authenticated user account may provide a first set of benefits, while payment of a subscription fee may provide a second set of benefits in addition to the first set of benefits.

The Content Provider Server API 120 can also be accessed by a back-end service layer 140. As illustrated in FIG. 1, the first party portal service 100 may include the back-end service 140 that carries out the first party portal services for the client device 150. The back-end service 140 is responsible for communicating with the different content sources 110 (via corresponding Content Provider Server APIs 120) that have available content for the user to view and perform processes to have that content available to the client device 150. The back-end service 140 may carry out instructions, for example, that may facilitate identifying formats of the content and subsequently formatting the content from these different content sources 110 so that they are usable by the client device 150. This may include extracting metadata associated with each of the content then using various different types of conversion techniques so that data stored in one format with respect to the content sources 110 can be rendered and displayed on the client devices 150, which may correspond to a second format.

As described above, the back-end service layer 140 is capable of accessing the Content Provider Server API 120 in order to obtain additional information about available content for the client device 150. Additional information, such as metadata, can be usable to provide details about the content being shown to the user.

The back-end service layer 140 is also capable of implementing additional functionalities associated with the various content sources 110. For example, information regarding chat services, ratings and profiles can also be provided from the video content sources 110 to the client device 150 via the Content Provider Server API 120. The back-end service layer 140 may carry out the instructions from the Content Provider Server API 120 used to implement the information related to chat services, ratings and profiles so that they appear on the client device 150.

The first party portal service 100 is compatible with any number of different client devices 150. The client device 150 (i.e. the user device) can include a plurality of different computing devices. For example, the client device 150 may include any number of different gaming consoles, mobile devices, laptops, and desktops. These client devices 150 may also run using a variety of different operating systems (e.g., iOS, Android), applications or computing languages (e.g., C++, JavaScript).

Figure 2:
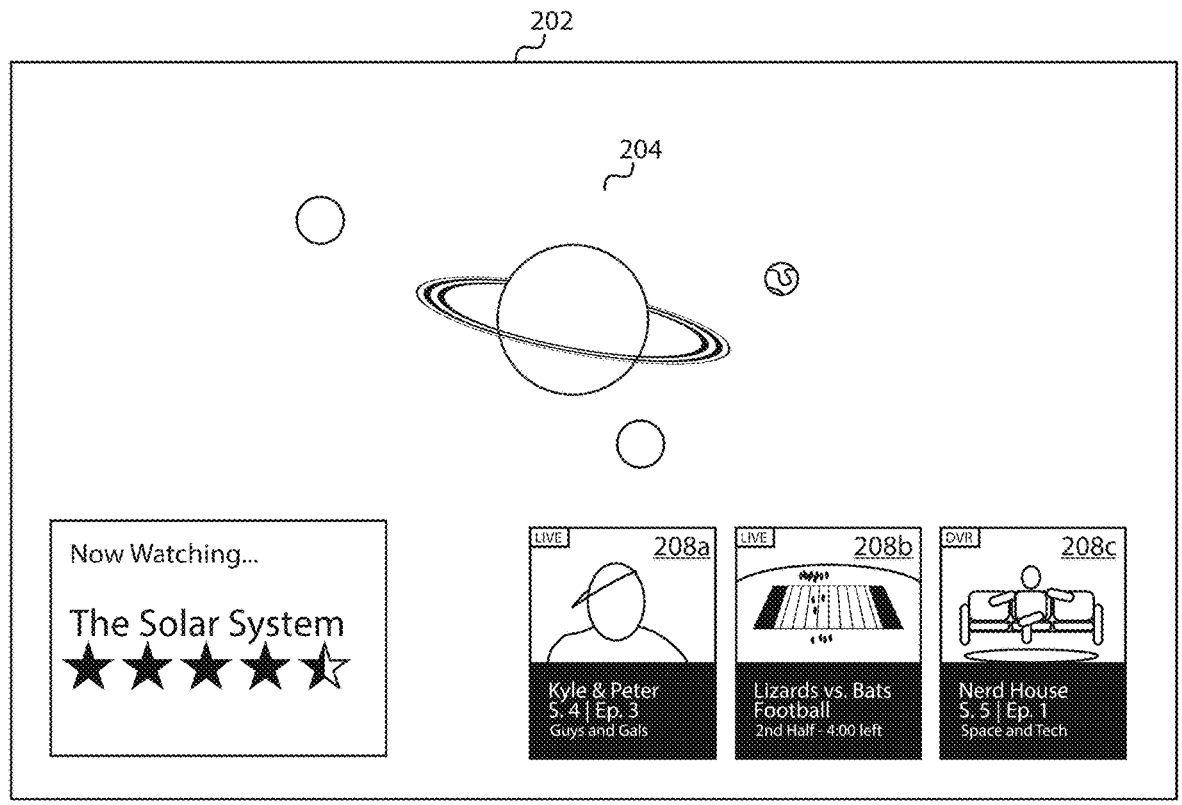
FIG. 2 shows an exemplary display for displaying main video content and previews.

FIG. 2 shows an exemplary display 202 for displaying main video content 204 and previews 208a-208c (collectively, previews 208). A person viewing main video content 204 may wish to see previews 208 of other video content from other sources. For example, a user might be watching a television show (e.g., main video content 204) and may want to check up on a football game (e.g., preview 208b).

Similarly, a user may wish to see if any other sources (e.g., channels) of video content are more interesting than main video content 204, the user might then wish to bring up a guide that shows previews 208 of other sources that the user can select. Such previews 208 may live and show the video content as it is available (e.g., "picture in picture"), or such previews 208 may be static and displayed as a thumbnail. Such a preview 208 may not be relevant or interesting, if the live preview displays a commercial, a lull in an otherwise eventful football match, etc. In order to provide a viewer with a more interesting and representative preview of the video content, the preview 208 can be time-shifted to begin at a more interesting location in the video content.

Figure 3:
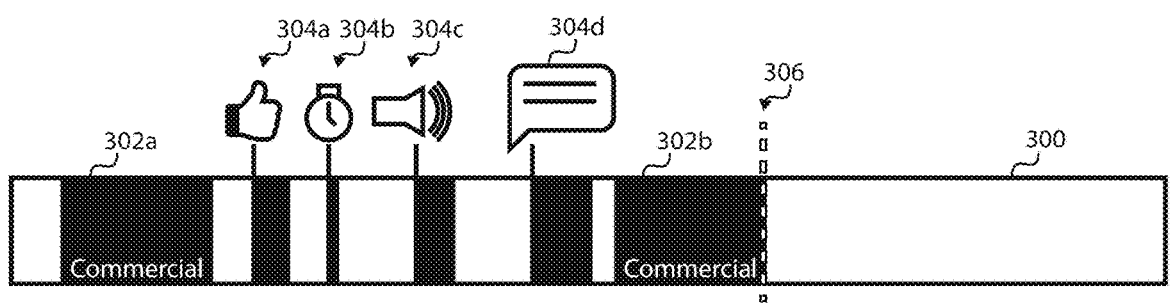
FIG. 3 shows an exemplary timeline for video content.

FIG. 3 shows an exemplary timeline 300 for an exemplary video content. Timeline 300 can include commercials (e.g., commercials 302a and 302b) and events 304a-304d (collectively, event 304). The live position 306 can be the current (e.g., most recent) time of the video content that is being streamed or broadcast in real-time. In FIG. 3, the live position 306 is during a commercial 302b while events 304a-304d precede commercial 302b and are preceded by commercial 302a. Various events 304 in timeline 300 are presented. For example, event 304a can be a social media event (e.g., people "liked" the video content, an uptick in "Tweets" with an associated hashtag, or otherwise associated with the video content at this time), event 304b can be a timing event (e.g., a timing event can occur every 30 seconds), event 304c can reflect the cheers of a live audience, and event 304d can represent a time where conversations about the video content occurred. An event 304 can have a start time, an end time, a duration, a score based on how significant the event is, an event type, a "spoiler" score, and other characteristics.

FIG. 4 shows an exemplary method 400 for detecting events in video content. The method 400 can be performed by client device 150, which can receive video content in step 402. Client device 150 can receive the content from back-end service layer 140, Content Delivery Network 130, or Content Provider Server API 120. In some embodiments, other components of system 100 can perform method 400. The video content can be pre-recorded and received from a network location or from local storage (e.g., video file retrieved from a hard drive or streamed from a video-on-demand source). The video content can also be live.

A system can detect metrics associated with the video content in step 404. The metrics can help identify events in the video content. Various points or periods of time can have associated metrics. For example, each second may be associated with detected characteristics that may be analyzed to generate metrics in real-time (e.g., for broadcast content) or based on previous content play (e.g., for stored or streamed content).

The metrics can be derived based on various characteristics of the video content. For example, metrics can be derived from an analysis of various sequences of images of the video content, audio stream of the video content, subtitles of the video content, metadata of the video content, etc. Metrics of the video content can pertain to volume (e.g., acoustic intensity), identified people in frame, detected expressions of people in frame, scene changes, duration of a video shot (e.g., fast cutting or quick cuts can indicate exciting content), live audience reaction (e.g., clapping, cheers, chants, etc.), camera motion (e.g., if the camera is steady or moving quickly), words being spoken (e.g., an analysis of those words can indicate a relative intensity or importance of the current scene), etc.

The metrics can be external to, but associated with, the video content. For example, the metrics can be based social media (e.g., instances of associated keywords or hashtags), activity on website associated with the video content, phone activity (e.g., text messages received through a system or phone calls), viewership information (e.g., total count of viewers or viewer demographics), etc.

In some embodiments, multiple metrics can be combined to score a certain time period of the video content. For example, an audience volume combined with social media can result in a score for that time period. The score can be an interest score that can indicate how interesting the time period likely is. In some embodiments, natural language and/or machine learning can be utilized. For example, a system can analyze a number and subject matter of social media posts and determine if the social media posts indicate that the point of time within the video content is particularly interesting or eventful.

A system can then detect a change in a metric at a time in step 406. For example, the system can determine that the volume increases from one time period to another time period. The system can further detect a change in an interest score.

A system can then log the time of the detected change in step 408. The system can log the detected change in metadata for the video content. In some embodiments, the system can identify subsections (e.g., scenes) of the video content based on the changes in a metric or metrics and assign each subsection an interest score based on the metrics. Subsections that have a high interest score or otherwise have metrics that indicate the subsection is interesting, can be termed an event.

An event can occur for video content of a sports game. The event can be associated with a team scoring or a play happening. The event can be determined by metrics associated with social media activity, such as people posting posts that are deemed excited or otherwise indicate an event happened in the game. The event can be determined by referencing a data source (or metrics) that indicate when plays or scores happen in the game, such as a play-by-play record. The event can be determined by metrics of audience excitement (e.g., if a predetermined percentage or number of spectators get on their feet or cheer). Audience excitement can be determined with respect to a variety of factors, including acoustic intensity to measure cheering. The event can be identified by metrics indicating a heightening level of announcer excitement as indicated by such indicia as increasing volume of the announcer's voice, pitch of the announcer's voice, or predetermined words spoken by the announcer. The event can be determined using metrics pertaining to a natural language and/or machine learning analysis (e.g., of what an announcer says) to detect that an event of interest is transpiring. The event can further be identified based on detection of an instant replay. For example, if a system detects a replay is being shown, the system can determine that an event as depicted in the replay has recently occurred. The system can then identify the event by matching the replay footage with the corresponding recorded live footage in the video content.

An event can occur during a dramatic show or movie. For example, metrics corresponding to a laugh track or live studio audience laughter can be detected as an indication that a comedic event recently occurred. An event can be detected by analyzing the subtitles for keywords associated with laughter. Metrics associated with scene changes can also indicate an event. The event can be a new scene or an important scene. A system can detect metrics of the relative positioning of characters to determine the relative intensity of a scene. For example, characters being close together can indicate intimacy or conflict. A scene with a relatively high intensity can be labelled as an event. A system can analyze the volume, pitch, or content of characters' speech to determine the intensity of a scene. A system can identify events based on trailers or promotional material for the program. For example, a trailer may identify various important scenes in a movie, and the system can match these scenes to the actual locations in the movie and identify those locations as events.

An event can be identified based on social media activity. Social media activity can include number of posts, messages, "likes", "favorites", subscriptions, follows, comments, trending patterns, etc. The video content can be associated with a tag, phrase, hashtag, account, etc. Usage metrics of the tag, phrase, hashtag, account, etc. can inform an event is occurring or recently occurred. A system can identify social media activity that corresponds to a certain emotion (e.g., happiness, excitement, sadness, shock, etc.) and identify events based only on selected emotions.

An event can be identified based on viewership. For example, if a lower-than-typical number of viewers stop watching the video content at a certain time period (indicating that viewers keep watching), the time period can be identified as corresponding to an event.

An event can be identified within videogame footage. For example, when something of interest occurs in the videogame, the videogame can flag it as an event. This can include when a player makes a kill, achieves an objective, scores a point, enters or leaves a current environment, etc. This can include when a game begins, when a time period elapses, when action is happening (as opposed to a score, status, or settings screen), etc.

It should be understood that a networked server can perform one or all of the steps of exemplary method 400. Additionally or alternatively, a client device (e.g., a device that may display the video content) can display one or more of the steps of exemplary method 400.

FIG. 5 shows an exemplary method 500 for displaying a preview of video content. A system (e.g., client device 150) can begin and receive a request to display a preview of video content in step 502. For example, a viewer might be watching main video content and take an action to bring up a channel guide displaying other channels or programs to view. In generating the guide, a system can request the preview(s) of video content for the guide. Similarly, generating a channel or program selection screen can involve requesting previews of video content.

A system can determine if the video content is live in step 504. "Live" can mean that the video content is still being generated.

If the video content is live, a system can select the most recent event in step 506. For example, a basketball game might have already had 30 baskets scored, each being identified as an event. The most recent basket scored can be selected, even if it is not the most interesting.

A system can then display a preview of the video content beginning at a time of the selected event in step 508. If an event has a start time and an end time, the preview can begin at the start time of the event. In some embodiments, a system can select the most recent event that is at least a predetermined amount of time before the current time. This can prevent the preview beginning and then immediately running out of interesting content or events to show in the preview; which could happen if the most recent event is followed by a commercial and the commercial is live. In some embodiments, the preview can be played back at a speed that is different than real-time.

If the video content is not live, a system can select a representative event of the video content in step 510. For example, the system can give all events an interest score and the system can select the event with the highest score. In some embodiments, the system can select a representative event based on whether the event likely has "spoilers" that might reveal interesting information about the video content (e.g., a final score or a climactic reveal).

A system can then display a preview of the video content beginning at a time of an event in step 512.

In some embodiments, an event can trigger the request to display a preview of the video content. For example, if a system detects an event that is of interest to a user (e.g., a favorite sports team scores a point), a system can then overlay the event as a preview above what is currently being displayed. If the event concludes in the preview, the preview overlay can be closed.

When an event in the preview ends, a system can select the next event that sequentially follows the event that ends, skipping non-events such as commercials or less interesting portions of the video content. Alternatively, the system can select another event that is representative of the video content, regardless of its location within the video content relative to the event that just ended. The system can select and display an event that has already been shown in the preview.

It should be understood that a networked server can perform one or all of the steps of exemplary method 500. Additionally or alternatively, a client device (e.g., a device that may display the video content) can display one or more of the steps of example method 500.

Figure 6:
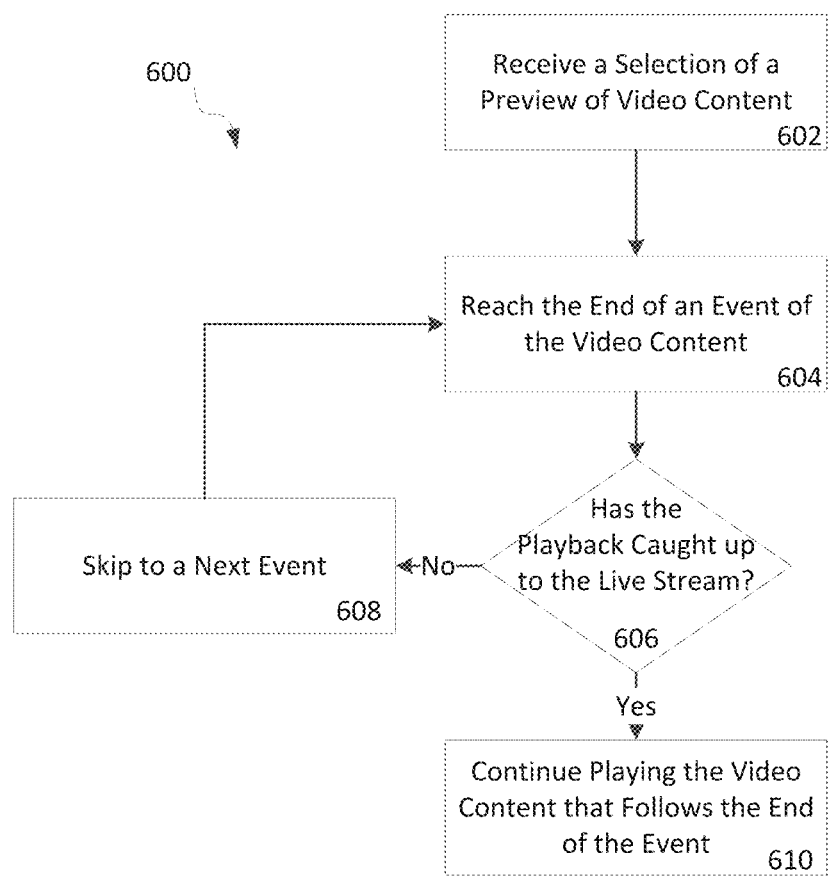
FIG. 6 shows an exemplary method for receiving a selection of a preview of video content.

FIG. 6 shows an exemplary method 600 for showing selected video content. A system can receive a selection of a preview of video content in step 602. For example, a viewer can select the preview of video content. The selection of the preview can cause the video content represented in the preview to be the main video content (e.g., main video content 204). A viewer might select a preview upon finding the video content in the preview interesting and the viewer wants to watch that video content.

The system may now determine how to continue playback after the selection. If the video content is a live stream and the event is a delayed portion of the live stream, the playback can skip from event to event in an attempt to "catch up" to the live stream. Exemplary method 600 highlights some features of this approach, though other approaches are anticipated. For example, the video content can begin playback at the beginning of the video content (e.g., at the beginning of the episode or game). The video content can begin playback at the beginning of a scene relevant to the preview. For example, if there are three scenes in a television show and the event highlighted in the preview occurs in during the second scene, the video content can begin playback at the beginning of the second scene. Scenes can be separated by identified commercial breaks. The video content can skip forward to the live position.

The video content, upon being selected and transitioning to be the main video content, can continue playing the event from the preview. This can give the illusion that the preview is representing a broadcast channel or otherwise be a live stream, even if it is delayed.

A system can then reach the end of an event of the video content in step 604.

A system can then determine whether the playback has caught up to the live stream in step 606. For example, the system can determine if the playback is now live and not delayed.

If the playback has not caught up to the live stream, a system can skip to a next event in step 608. For example, the system can skip over commercials or other less-interesting portions of the video content to get to the subsequent event. Alternatively, the system can playback the intervening portions of the video content (the less-interesting portions or commercials) at a faster rate than real-time playback. For example, if the video content is a football game, the plays (where the ball is in motion) can be the events, and the intervening huddles, replays, and reports can be played back at a faster rate.

If the playback has caught up to the live stream, a system can continue playing the video content that follows the end of the event in step 610.

Figure 7:
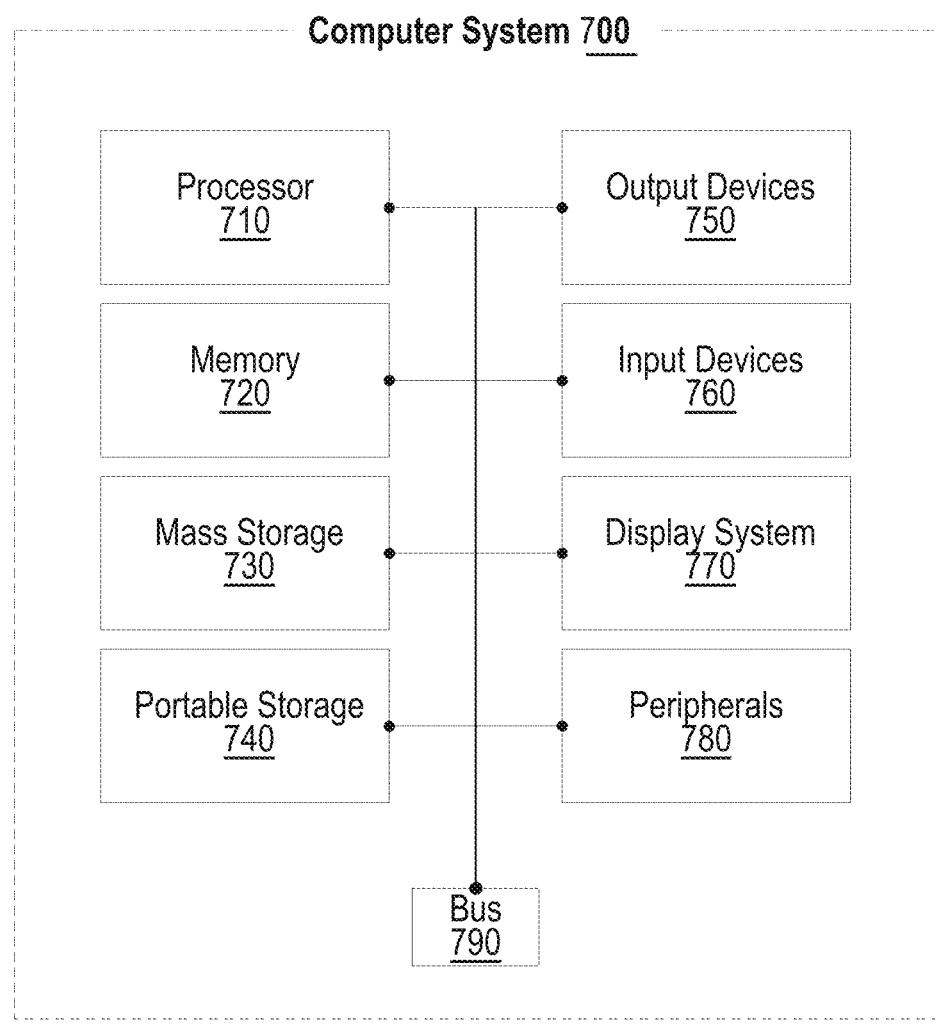
FIG. 7 illustrates an exemplary computing system that may be used to implement an embodiment of the present invention.

FIG. 7 illustrates an exemplary computing system 700 that may be used to implement some embodiments of the present invention. For example, any of the computer systems or computerized devices described herein may, in at least some cases, be a computing system 700. The computing system 700 of FIG. 7 includes one or more processors 710 and memory 710. Main memory 710 stores, in part, instructions and data for execution by processor 710. Main memory 710 can store the executable code when in operation. The system 700 of FIG. 7 further includes a mass storage device 730, portable storage medium drive(s) 740, output devices 750, user input devices 770, a graphics display 770, and peripheral devices 780.

The components shown in FIG. 7 are depicted as being connected via a single bus 790. However, the components may be connected through one or more data transport means. For example, processor unit 710 and main memory 710 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 can store the system software for implementing embodiments of the present invention for purposes of loading that software into main memory 710.

Portable storage device 740 operates in conjunction with a portable non-volatile storage medium, such as a floppy disk, compact disk or Digital video disc, to input and output data and code to and from the computer system 700 of FIG. 7. The system software for implementing embodiments of the present invention may be stored on such a portable medium and input to the computer system 700 via the portable storage device 740.

Input devices 770 provide a portion of a user interface. Input devices 770 may include an alpha-numeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Examples of suitable output devices include speakers, printers, network interfaces, and monitors.

Display system 770 may include a liquid crystal display (LCD), a plasma display, an organic light-emitting diode (OLED) display, an electronic ink display, a projector-based display, a holographic display, or another suitable display device. Display system 770 receives textual and graphical information, and processes the information for output to the display device. The display system 770 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 780 may include any type of computer support device to add additional functionality to the computer system. For example, peripheral device(s) 780 may include a modem or a router.

The components contained in the computer system 700 of FIG. 7 are those typically found in computer systems that may be suitable for use with embodiments of the present invention and are intended to represent a broad category of such computer components that are well known in the art. Thus, the computer system 700 of FIG. 7 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer system 700 may in some cases be a virtual computer system executed by another computer system. The computer can also include different bus configurations, networked platforms, multi-processor platforms, etc. Various operating systems can be used including UNIX, Linux, Windows, Macintosh OS, Palm OS, Android, iOS, and other suitable operating systems.

In some cases, the computer system 700 may be part of a multi-computer system that uses multiple computer systems 700, each for one or more specific tasks or purposes. For example, the multi-computer system may include multiple computer systems 700 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 700 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for displaying a preview of a live stream, the method comprising:
   monitoring a live stream over a communication network;
   defining a plurality of events within the live stream in real-time based on a set of characteristics met by the defined events;
   providing the live stream to a client device, wherein the live stream is presented at the client device with a timeline that includes a period of delay, and wherein the timeline indicates that the period of delay includes one or more of the defined events;
   receiving a request from the client device to skip a time period within the period of delay prior to a start time of an identified one of the defined events within the timeline of the live stream; and
   updating a display of the live stream by skipping an intervening portion of the live stream corresponding to the time period prior to the start time of the identified event and beginning play of the live stream at a portion corresponding to the identified event.

2. The method of claim 1, wherein the timeline of the live stream includes an indicator associated with the start time within the timeline.

3. The method of claim 1, wherein the set of characteristics includes user activity at the start time within the timeline.

4. The method of claim 1, wherein the set of characteristics includes a detected change at the start time within the timeline.

5. The method of claim 1, wherein the timeline includes a plurality of defined events, and further comprising updating the display of the live stream by skipping another intervening portion of the live stream corresponding to a time period prior to a start time of a next one of the defined events and playing the live stream at another portion corresponding to the next defined event.

6. The method of claim 1, wherein updating the display of the live stream includes playing another intervening portion of the live stream corresponding to the time period prior to the start time of the identified event at a different rate than real-time playback.

7. The method of claim 6, wherein the different rate is faster than real-time playback.

8. The method of claim 1, further comprising identifying an end time of the identified event within the timeline of the live stream.

9. The method of claim 1, wherein the live stream corresponds to videogame footage, and further comprising flagging the identified event based on gameplay data associated with the gameplay footage.

10. A system for displaying a preview of a live stream, the system comprising:
   a communication interface that communicated over a communication network, wherein the communication interface receives information regarding a live stream; and
   a processor that executes instructions stored in memory, wherein the processor executes the instructions to:
   monitor a live stream;
   define a plurality of events within the live stream in real-time based on a set of characteristics met by the defined events;
   provide the live stream to a client device, wherein the live stream is presented at the client device with a timeline that includes a period of delay, and wherein the timeline indicates that the period of delay includes one or more of the defined events;
   receive a request from the client device to skip a time period within the period of delay prior to a start time of an identified one of the defined events within the timeline of the live stream; and update a display of the live stream by skipping an intervening portion of the live stream corresponding to the time period prior to the start time of the identified event and beginning play of the live stream at a portion corresponding to the identified event.

11. The system of claim 10, wherein the timeline of the live stream includes an indicator associated with the start time within the timeline.

12. The system of claim 10, wherein the set of characteristics includes user activity at the start time within the timeline.

13. The system of claim 10, wherein the set of characteristics includes a detected change at the start time within the timeline.

14. The system of claim 10, wherein the timeline includes a plurality of defined events, and wherein the processor executes further instructions to update the display of the live stream by skipping another intervening portion of the live stream corresponding to a time period prior to a start time of a next one of the defined events and playing the live stream at another portion corresponding to the next defined event.

15. The system of claim 10, wherein the processor updates the display of the live stream by playing another intervening portion of the live stream corresponding to the time period prior to the start time of the identified event at a different rate than real-time playback.

16. The system of claim 15, wherein the different rate is faster than real-time playback.

17. The system of claim 10, wherein the processor executes further instructions to identify an end time of the identified event within the timeline of the live stream.

18. The system of claim 10, wherein the live stream corresponds to videogame footage, and wherein the processor executes further instructions to flag the identified event based on gameplay data associated with the gameplay footage.

19. A non-transitory, computer-readable storage medium, having embodied thereon a program executable by a processor to perform a method for displaying a preview of a live stream, the method comprising:

monitoring a live stream over a communication network;

defining a plurality of events within the live stream in real-time based on a set of characteristics met by the defined events;

providing the live stream to a client device, wherein the live stream is presented at the client device with a timeline that includes a period of delay, and wherein the timeline indicates that the period of delay includes one or more of the defined events;

receiving a request from the client device to skip a time period within the period of delay prior to a start time of an identified one of the defined events within the timeline of the live stream; and updating a display of the live stream by skipping an intervening portion of the live stream corresponding to the time period prior to the start time of the identified event and beginning play of the live stream at a portion corresponding to the identified event.

* * * * *